(12) United States Patent
Tong et al.

(10) Patent No.: US 7,213,976 B2
(45) Date of Patent: May 8, 2007

(54) SUBSTRATE ASSEMBLY FOR OPTICAL COUPLING OF LASERS AND RECEIVERS

(75) Inventors: Franklin F. K. Tong, New Territories (HK); Allan Hui, Shatin (HK)

(73) Assignee: SAE Magnetics (Hong Kong) Limited, New Territories (HK)

(*) Notice: Subject to any disclaimer, the term of this patent is extended or adjusted under 35 U.S.C. 154(b) by 75 days.

(21) Appl. No.: 10/644,762

(22) Filed: Aug. 21, 2003

(65) Prior Publication Data

US 2004/0101019 A1    May 27, 2004

(51) Int. Cl.
*G02B 6/36* (2006.01)
(52) U.S. Cl. .............................. 385/82; 385/64; 385/76
(58) Field of Classification Search ............ 385/55–56, 385/58–60, 63–64, 70–72, 76–78, 82, 84, 385/88–89, 92
See application file for complete search history.

(56) References Cited

U.S. PATENT DOCUMENTS 6,767,141 B1 * 7/2004 Dudek et al. ................. 385/92

\* cited by examiner

*Primary Examiner*—Michelle Connelly-Cushwa
*Assistant Examiner*—Jerry T Rahll
(74) *Attorney, Agent, or Firm*—Bingham McCutchen LLP

(57) ABSTRACT

A connector body is provided that incorporates features for coupling between optical subassemblies. The connector body incorporates internal pin bores between opposing sides and an array of internal bores for carrying optical fibers between the opposing sides. The pin bores are adapted to receive centering pins that penetrate the connector body and facilitate connecting the connector body to a mating substrate one side and to mating optical fibers at the other side.

15 Claims, 5 Drawing Sheets

FIG. 5A  FIG. 5B

SUBSTRATE ASSEMBLY FOR OPTICAL COUPLING OF LASERS AND RECEIVERS

FIELD OF THE INVENTION

The present invention relates generally to assemblies for converting between electrical and optical signals and, more particularly, to an optical connector having features that facilitate interconnection and alignment at front and back ends to other optical assemblies using centering pins.

BACKGROUND OF THE INVENTION

Optical fiber technology is well suited for communications applications because optical fibers have a wide transmission bandwidth and relatively low attenuation. However, optical fiber interfaces to electronic and optical networks are expensive to manufacture because of the difficulty associated with mounting laser transmitting and receiving devices onto substrates and aligning them with separately mounted optical fibers. The difficulties generally are associated with manufacturing components with precise tolerances and mounting components at precise locations within precise tolerances. To overcome these difficulties, the last mounting and aligning processes have been done actively, with beams being transmitted between the optical fibers and active optical components, to ensure that the completed assembly is properly aligned and functional.

Conventionally, optical assemblies have incorporated at least three main elements for connecting optical fibers to active optical components: a connector body, a substrate onto which active optical components are mounted and a platform for supporting and attaching both the connector and the substrate. While this conventional technique has been implemented to create optical assemblies, it would be desirable to create assemblies with fewer and/or smaller components.

Accordingly, there is a need for an optical assembly and method for mounting a connector and a substrate without the need for a separate platform. The assembly and method ideally should be compatible with edge emitting and surface emitting laser technology. There is a further need for an optical assembly that incorporates features to facilitate alignment and interconnection of mating parts without greatly increasing the size of the assembly. There is a further need for an optical assembly that incorporates features to facilitate internal mounting and alignment with an economy of parts and external mounting and alignment of mating parts to the assembly.

SUMMARY OF THE INVENTION

According to the present invention, a connector body is provided that incorporates features for coupling between optical subassemblies. The connector body incorporates internal pin bores between opposing sides and an array of internal bores for carrying optical fibers between the opposing sides. The pin bores are adapted to receive centering pins that penetrate the connector body and facilitate connecting the connector body to a mating substrate one side and to mating optical fibers at the other side. Using the centering pins, the connector body may be easily mounted to other components or subassemblies during assembly or connecting processes. The centering pins tend to eliminate costs associated with separate mounting platforms and tend to facilitate alignment mating of parts.

The array of bores for holding optical fibers may be situated between the pin bores. In addition, the connector body may incorporate a pair of cavities, each cavity extending from a surface of the body to a corresponding pin bore. The pair of cavities may be isolated from the array of bores and may be used to apply adhesive to adhere the centering pins to the connector body during assembly. The connector body may further incorporate a central cavity extending from a surface of the body to the array of bores. The central cavity may be used to apply adhesive to adhere optical fibers to the connector body during assembly. The connector body may further include a beveled surface adjacent to the array of bores. The beveled surface may be used to facilitate cutting angled ends into optical fibers that protrude from the array of bores.

According to another embodiment of the present invention, a substrate is provided for mating optical components with an optical connector body. The substrate includes at least two canals formed in a surface of the substrate that extend from an edge of the substrate. The canals are adapted to receive centering pins used to align and connect the optical connector body to the substrate. The substrate may further include an active optical component mounted to a surface for transmitting or receiving at least one beam toward the edge of the substrate. The substrate may further include a lens component mounted to the substrate between the active optical component and the edge of the substrate for focusing at least one of the beams.

According to another embodiment of the present invention, an optical assembly for mating optical fibers and terminating optical components includes a connector body, a substrate, optical fibers, an active optical component and centering pins. The connector body has opposing first and second surfaces and two pin bores extending from the first surface to the second surface. The body also includes an array of bores extending between the first and second surfaces. The optical fibers are positioned within at least some of the bores in the array of bores. The substrate includes at least two canals formed that extend from an edge of the substrate. The centering pins are positioned in the pin bores and the canals and connect the connector body to the substrate. The active optical component is mounted on the substrate engaged in optical communication with at least some of the optical fibers.

BRIEF DESCRIPTION OF THE FIGURES

The above described features and advantages of the present invention will be more fully appreciated with reference to the detailed description and accompanying figures, which present illustrative embodiments that are not intended to limit the invention.

FIGS. 5A and 5B depict an assembly incorporating a cover according to an embodiment of the present invention.

DETAILED DESCRIPTION

According to the present invention, a connector body is provided that incorporates features for coupling between optical subassemblies. The connector body incorporates internal pin bores between opposing sides and an array of internal bores for carrying optical fibers between the opposing sides. The pin bores are adapted to receive centering pins that penetrate the connector body and facilitate connecting the connector body to a mating substrate one side and to mating optical fibers at the other side. Using the centering pins, the connector body may be easily mounted to other components or subassemblies during assembly or connecting processes. The centering pins tend to eliminate costs associated with separate mounting platforms and tend to facilitate alignment mating of parts.

Figure 1:
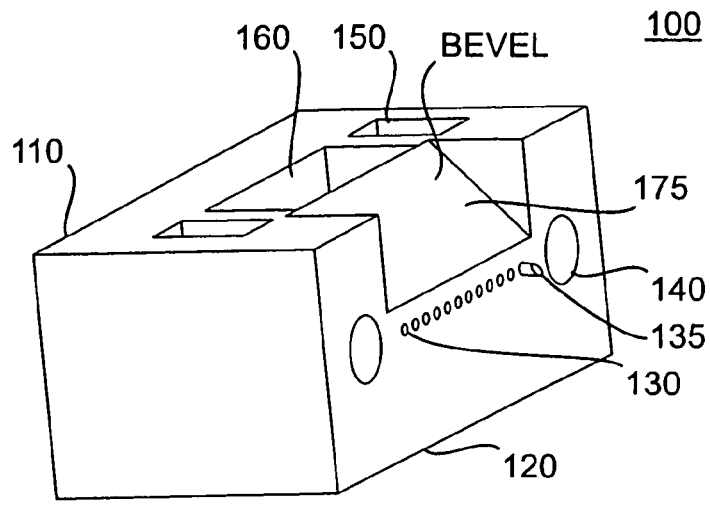
FIG. 1 depicts a connector body according to an embodiment of the present invention.

FIG. 1 depicts a connector body 100 according to an embodiment of the present invention. The connector body 100 may be implemented as part of an assembly to mount optical fibers in a communicating relationship with active optical devices on a substrate. Referring to FIG. 1, the connector body is shown to be substantially rectangular in three dimensions with features cut into the body. The rectangular shape, however, is merely one embodiment of the body, which may be implemented in any convenient shape.

The connector body 100 includes opposing sides 110 and 120 and an array of bores 130. The array of bores 130 are sized to carry optical fibers 135 from side 110 to side 120 within the connector body. As a result, the bores have a diameter that is slightly larger than the diameter of an optical fiber without buffer. In general, the array of bores 140 are substantially co-planar and have a pitch that is determined by the pitch of active optical components with which the connector body 100 will mate. As an illustrative example, a bore within the array of bores may have an inside diameter or dimension of 125 microns. The pitch of bores may illustratively be 250 microns. However, any bore size and pitch may be used for the array and the array may have regular or irregular spacing. In addition, the bores according to some embodiments may or may not be co-planar or may include layers. The side 110 may be referred to as the "front" because in general it connects optical fibers from the array of bores to mating optical fibers that are carried to other systems or assemblies. The side 120 may be referred to as the "back" side because in general it couples the optical fibers to active optical components which terminate the optical fiber link, such as laser emitting and receiving components.

The connector body 100 also include pin bores 140. The pin bores 140 may traverse the body 100 from side 110 to side 120 and present openings at both sides 110 and 120. Alternatively, the pin bores 140 may penetrate only part of the body depending on the implementation. For example, the pin bores may not present openings to the front side 110. However, according to the present invention the pin bores present openings at the side 120. As an alternative to pin bores, the pins may be molded or machined as part of the connector body. According to still other embodiments, the front side 110 may include pin bores for receiving mating pins from another component thus making it a female connector.

The pin bores are sized to receive centering pins (shown in FIG. 2). The pin bores may have any inside diameter according to any convenient set of design and pin cross-section considerations. As an illustrative example, the pin bores may have an inside diameter or dimension of 700 microns.

The centering pins facilitate attachment of the connector body 100 to mating components. According to one embodiment of the present invention, the centering pins are used to attach the connector body to a substrate that includes optical components on a surface thereof. The optical components may be laser transmitting or receiving devices and may use vertical or horizontal optical transmitting or receiving technology.

The connector body 100 may further include cavities with openings to a surface thereof. Referring to FIG. 1, the connector body is shown to have a pair of cavities 150 and a central cavity 160. The cavities 150 are isolated from the array of bores 135. The cavities 150 in the body are formed so that the cavities open to a surface, such as the surface 170. The cavities 150 each also opens to one of the pin bores 140. The cavities 150 allow one to apply adhesive to the pin bores through the portion of the cavity 150 that opens to the surface 170. When a centering pin is positioned within the bore 140, adhesive applied within each cavity 150 is drawn into the bores by capillary action between the centering pin and the walls of each pin bore 140. In this manner, the cavities 150 facilitate applying adhesive to adhere the centering pins to the body 100 within the bores 140. The cavity 150 may have a rectangular cross section or any other convenient shape.

The body 100 may further include a cavity 160 that opens to a surface, such as the surface 170. The cavity 160 allows one to apply adhesive to the array of bores through the portion of the cavity that opens to the surface 170. When optical fibers are positioned within the array of bores 130, adhesive applied within each cavity 160 is drawn into the bores 130 by capillary action between the fibers and the walls of each bore 130. In this manner, the cavity 160 facilitates applying adhesive to adhere fibers to the body 100 within the bores 130. The cavity 160 may have a rectangular cross section or any other convenient shape.

The connector body 100 may further include a bevel 175. The bevel 175 may comprise a cut out from the body 100 that results in a surface that extends from the back side toward the front side. As shown in FIG. 1A, the bevel 175 comprises a surface that extends from the back side, adjacent to the array of bores toward the front side. The bevel intersects the surface 170 and forms a plane that has an acute angle relative to the plane of the array of bores. The angle may be 45 degrees or any other convenient acute angle. The angle is chosen to ensure proper reflection of a beam off of the angled end face of the optical fiber between a vertically oriented optical transmitting or receiving component and the horizontally disposed optical fiber.

The bevel facilitates cutting the edges of optical fibers 135 on the back side of the connector body 100. According to one embodiment of the invention, the ends of the fibers that protrude from the back side 120 are cut with a laser beam to an angle of approximately 45 degrees (or other acute angle) measured between the plane of the bores 130 and the surface 170. The bevel 175 facilitates cutting the fibers 135 in the following manner. After the fibers 135 have been adhered within the body, the bevel provides a line of sight between the surface 170 and the back ends of the fibers 135 at a position close to the back side 120 of the body. A laser cutting device may be positioned to project a cutting beam along the line of sight to cut the rear ends of the fibers 135 to a 45 degree angle. Although a 45 degree angle has been described, the bevel and the ends of the fibers may be set at any convenient acute angle according to design considerations. Moreover, in addition to laser cutting, the fiber end may be cut according to any convenient cutting technique.

The connector body 100 may be made of a variety of materials including silicon, plastic, glass, ceramic or metal. The connector body may be formed by any convenient manufacturing technique, including molding. The features of the connector body 100, including the surfaces and bores described above, may be formed while molding the body or by machining the body, drilling the body or combinations thereof.

Figure 2A:
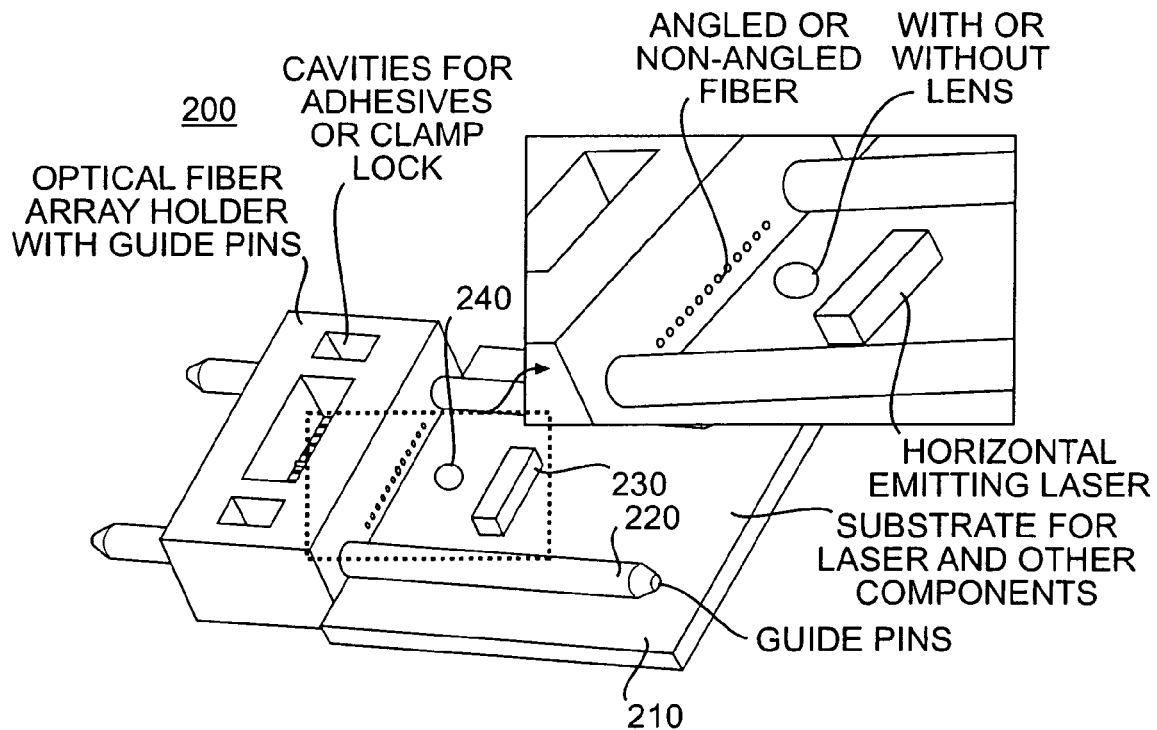
FIG. 2A depicts an optical assembly that includes a connector body, a mating substrate and centering pins according to an embodiment of the present invention.
Figure 2B:
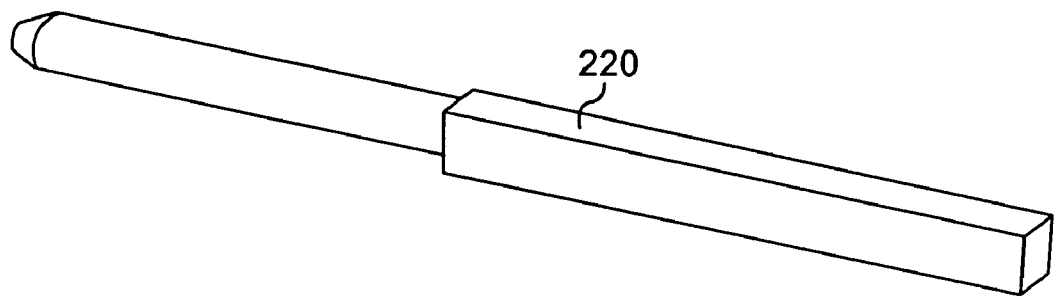
FIGS. 2B and 2C depict alternative embodiments of centering pins.
Figure 2C:
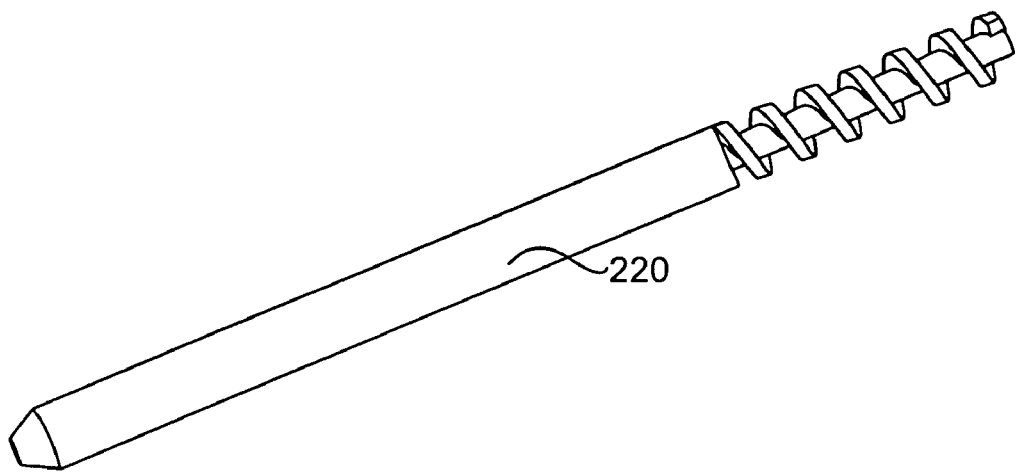

FIG. 2A depicts an assembly 200 that includes a connector body 100, a substrate 210 and centering pins 220. Referring to FIG. 2A, the connector body 100 is coupled to the substrate 210 using centering pins 220. The centering pins 220 may be made of any convenient material, including metal, glass, plastic or a combination thereof. The centering pins may have a uniform circular cross-section as shown in FIG. 2A. Alternatively, the centering pins may have different cross-sections or irregular shapes as shown in FIG. 2B and FIG. 2C. FIG. 2B shows a centering pin 220 having a circular cross-section along part of its length and a rectangular cross section along another part of its length. There are an infinite number of pin variations that are possible. FIG. 2C depicts a centering pin 220 having a screw threaded end for screw locking the pin into position. The pin bore may be threaded to receive a screw threaded pin such as that depicted in FIG. 2C.

During assembly, the centering pins 220 are positioned within the bores 140 of the connector body and are adhered to the connector body with an adhesive such as epoxy or solder. The pins 220 may also be welded to the connector body 100. The centering pins 220 may be positioned within the connector body so that the pins 220 extend from both the front side 110 and back side 120 of the connector body. The back side protrusions of the pins 220 are used to fasten the connector body to the substrate 210. This is performed by positioning the pins 220 relative to the substrate, as described below, and then adhering the pins to the substrate, by for example epoxy, soldering or welding in a well known manner.

The substrate 210 includes active optical components that are used to terminate the optical fibers within the connector body 100. The optical components may be semiconductor components that convert between electrical impulses and optical impulses. Accordingly, the substrate 210 may be a printed circuit board that includes one or more dielectric layers and metallization used to electrically couple the optical components to power, ground and signal pins on the substrate 210. The optical components are positioned and attached to the substrate in such a manner that they are in proper optical communication with the fibers 135 within the fiber array 130.

Figure 3:
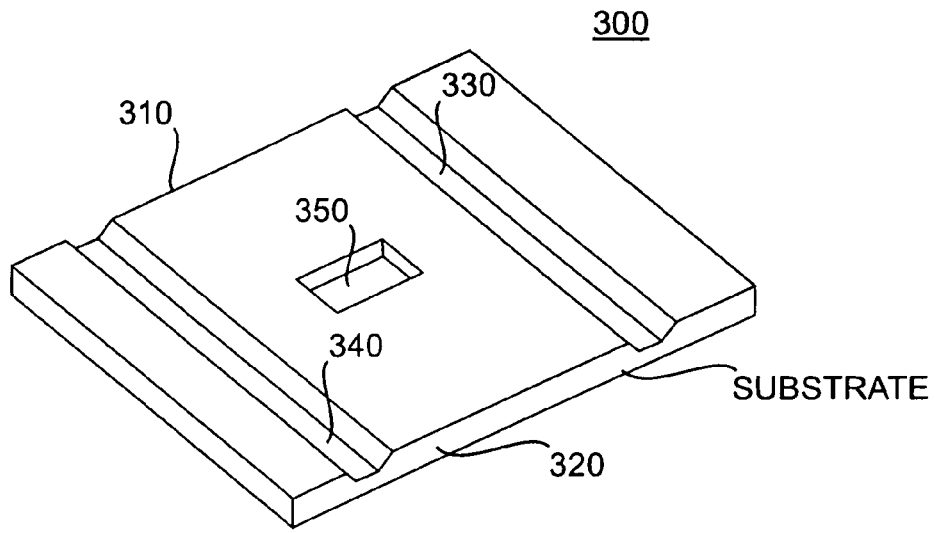
FIG. 3 depicts a substrate having wells that receive centering pins according to an embodiment of the present invention.

FIG. 3 depicts a surface view of an exemplary substrate 300 according to an embodiment of the invention. Referring to FIG. 3, the substrate 300 includes opposing sides 310 and 320 and a surface 330. The substrate 300 includes grooves 340 that are formed in the surface 330 to accommodate centering pins. The grooves extend in a longitudinal direction between the sides 310 and 320. The grooves need not traverse the entire substrate from side 310 to 320. Rather, only a portion of the surface between 310 and 320 may be traversed beginning from side 310, which is the side that mates with the connector body 100. The grooves are sized and shaped to form a tight coupling with the pins 220. Accordingly, each groove generally includes a longitudinal cross-section that is approximately equal in size and shape to external dimension of the pins 220 or a portion thereof. The cross-section of the pins and therefore the groove may be circular, rectangular, triangular or any other convenient shape. According to one embodiment of the invention, the depth of the groove is set to control the height of the fibers 135 within the array of bores when the pins 220 are positioned within the grooves 340.

The substrate 300 may further include wells 350 for aligning and mounting optical components. The wells 350 may have a depth, length and width according to the size of the optical component that it will accommodate. Although not shown, the well may further include on a surface thereof pin metallization. During attachment of a component within the well, solder balls on the metallization may be used to secure and electrically couple the optical component to the substrate 300.

Referring again to FIG. 2, an optical component 230 is positioned within the well 350. The optical component 230 is of the horizontal emitting or receiving type. The component 230 includes light emitting or receiving elements that are positioned and spaced apart in a pitch that matches the pitch of the array of bores 130 within the connector body 100. During alignment of the connector body 100 to the substrate 210, the light emitting or receiving elements of the component are positioned to transmit or receive a beam from the fibers 135 protruding from the back side 120 of the connector body 100. In this embodiment, the ends of the fibers protruding from the back side 120 of the body 100 are generally cut at various angles offset from the 90 degree angle relative to the plane of the array. The ends may also be flush with the body 100. According to this embodiment, a bevel may or may not be included in the body 100.

During use of the assembly 200 depicted in FIG. 2, the component 240 may transmit an array of laser beams into the fibers 135 within the array of bores for transmission to remote devices over an optical fiber network coupled to the front side 110 of the body 100. Similarly, when the component 240 is a receiver, the component may receive an array of laser beams from the fibers 135 and translate the received beams into electrical impulses that are transmitted to other components on the substrate 210 or off of the substrate 210.

According to one embodiment of the invention, the substrate 210 may further include a lens 240 mounted on a surface between the component 230 and the side that adjoins the connector body 100. The lens 240 is accordingly positioned between the back ends of the optical fiber array and the component 240 and is used to focus one or more beams of light to facilitate optical communication between optical signaling elements on the component 240 and one or more optical fibers. The lens 240 may include a single lens or an array of lenses for focusing, collimating, attenuating, polarizing, shaping, directing or otherwise altering a single beam or an array of beams.

Figure 4:
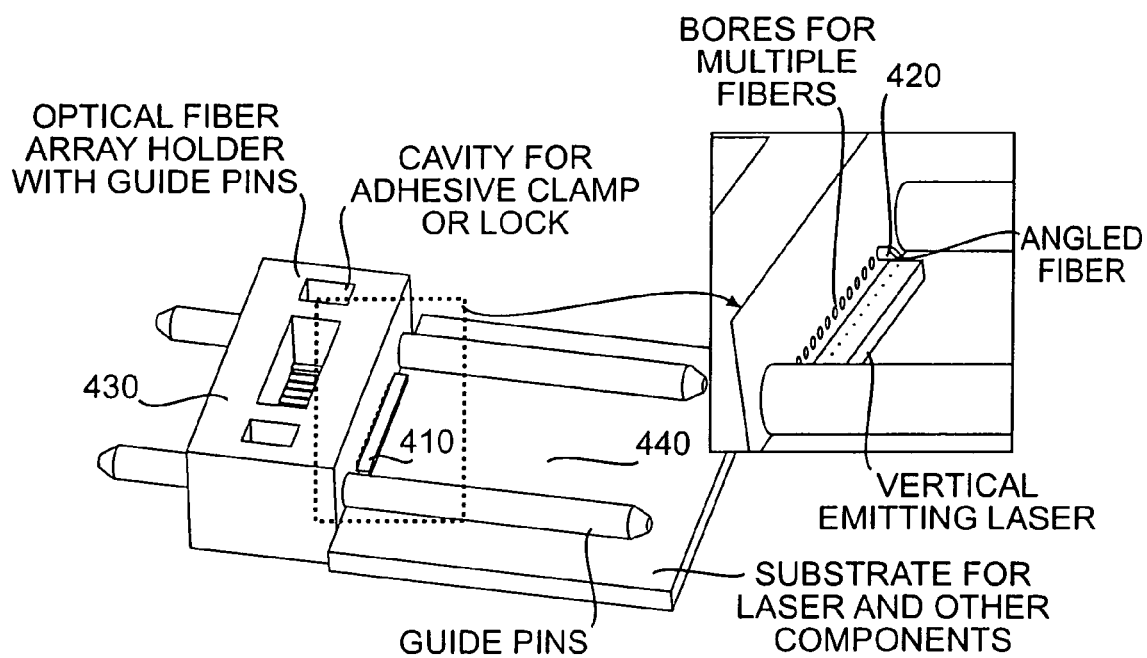
FIG. 4 depicts an optical assembly that includes a vertical cavity surface emitting laser component according to an embodiment of the present invention.

FIG. 4 depicts an assembly according to another embodiment of the present Invention. Referring to FIG. 4, the assembly 400 is very similar to the assembly 200. However, the assembly of FIG. 4 includes an optical component 410 that implements a vertical, instead of horizontal, emitting or receiving optical component. The component 410 is positioned on the side of the substrate 420 that is closest to the connector body 100. In particular, the component 410 is positioned so that the vertical emitting or receiving elements of the component are optically coupled with the optical fiber 420 in the following manner.

The end of the optical fiber has a translucent base and has an end face with an acute angle of approximately 45 degrees (or other convenient angle) between the plane of the optical fiber and the upper surface of the connector. Reflective coatings may be selected and applied to the end face of the fiber to control the amount of light being reflected off of the angled surface.

When the component includes vertical transmitting optical elements, such as vertical cavity surface emitting lasers, each laser from the component transmits a beam of light vertically into bottom of the corresponding fiber. The incident beam then traverses the end of the fiber and reflects off of the angled end surface along the length of the fiber toward the front of the connector 430.

When the component 410 includes vertical optical receiving elements, such as photodiodes, the incident beam from the front side 430 reaches the back side 440 and reflects off of the angled end surface, through the bottom of the fiber, and into the photodiode.

Figure 5C:
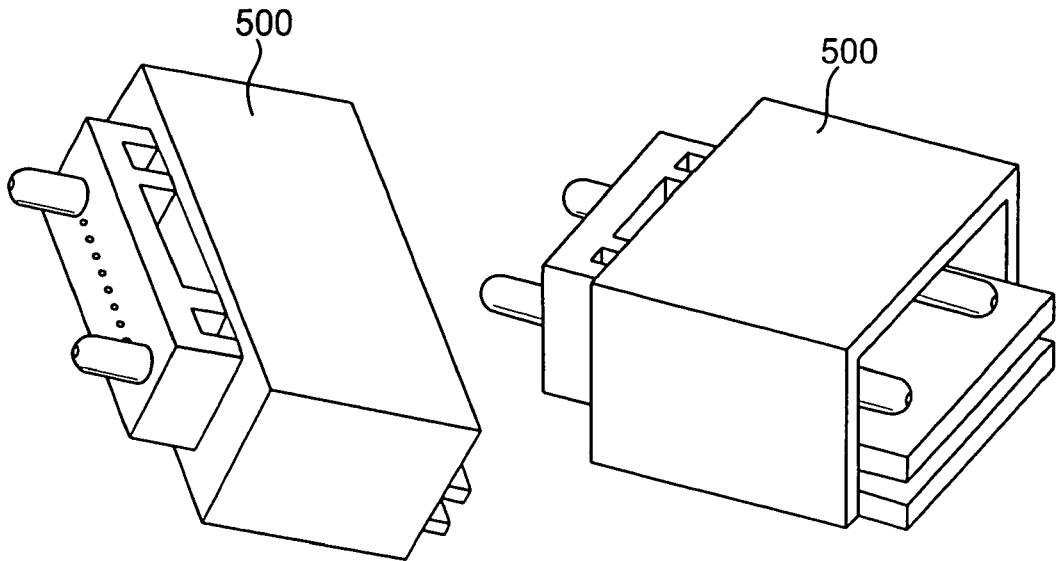
FIG. 5C depicts a cross-section of an assembly incorporating a cover according to an embodiment of the present invention.
Figure 5C:
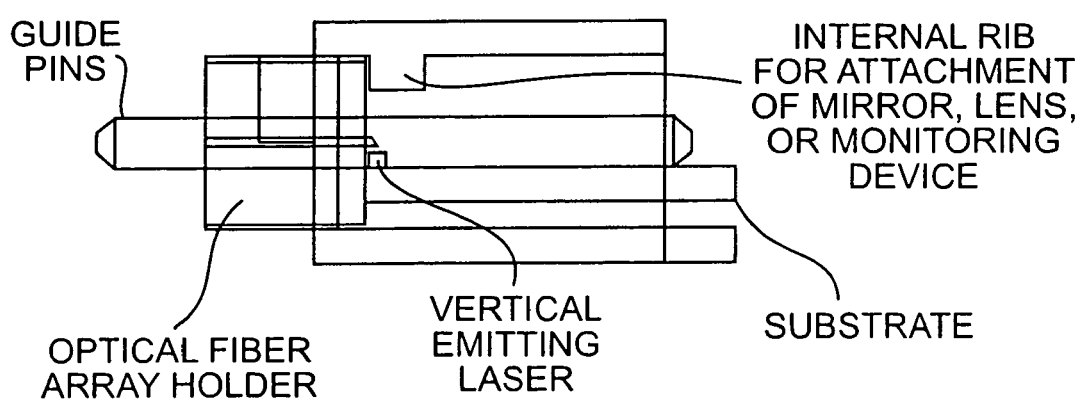

FIGS. 5A and 5B depict a cover 500 which may be applied to the assemblies of FIGS. 2 or 4. Referring to FIGS. 5A and 5B, the cover 500 may be a substantially hollow and rectangular housing sized to surround and mate with the back portion of the connector body 100. The cover may include a rib, shown in the cross-sectional view of the assembly, FIG. 5C. The rib acts to abut the cover with the connector and therefore facilitate alignment of the cover with the assemblies 200 and 400. The cover may be made of plastic, glass, ceramic, metal or any other convenient material.

The rib may further serve as the seat for a mirror according to an embodiment of the invention. For example, when a vertical cavity surface emitting laser is implemented on a component 410 of the assembly 400, a portion of the light beam directed into the base of the fibers does not reflect off of the angled end surface of the optical fiber. Rather, a portion of the beam is transmitted through the optical fiber and out the top. The mirror affixed to the rib may reflect this portion of the transmitted light back to the surface of the substrate 440 or to the component 410 where this light may be measured by an optical monitoring device. The monitoring device is used to monitor the integrity of the laser and produce a signal when the laser fails or otherwise operates insufficiently.

The cover 500 may be made of plastic, glass, ceramic, metal or any other convenient metal. According to one embodiment of the invention, the hollow portion of the cover that surrounds the substrate may be injected with a translucent encapsulant, such as silicone, for protection of the assembly and devices on the assembly.

The optical fibers on the front and back side of the connector 100 may be cut with a laser beam or with another cutting tool. If necessary, the end faces of the optical fibers may be polished after cutting. When a laser cutting tool is used, polishing may not be necessary. The optical fibers on the back side of the connector 100 may be made vertically or at an acute angle relative to the plane of the array of optical fibers. The angle may be any angle between 0 and 90 degrees and is chosen to facilitate reflecting a beam off of the end face either along the optical fiber or toward a receiving element on an optical component.

Components are attached to the substrate during assembly. The components may be any active optical components, such as optical transmitting and receiving devices. Other electronic devices may also be mounted on the substrate to facilitate driving signal on or off of the substrate, to perform signal processing or for any other useful purpose.

The pins may be inserted into or through the connector body 100 and the body and pins are aligned relative to the substrate. This alignment may be accomplished actively in a well known manner with the optical components of the substrate being active. Alternatively, when wells and grooves are provided in the substrate, the alignment may be performed passively by positioning the pins with the grooves of the substrate and pin bores of the connector body.

With the pins, connector body and substrate properly aligned, the pins may be adhered to the connector body 100 and substrate in step 640. The adhering may be accomplished through the use of adhesive applied to the cavities 150 as described above, by soldering, welding or any other convenient attachment scheme.

In this manner, a connector body may be conveniently deployed with optical fibers and centering pins to create an assembly with the substrate. A cover may be adhered to the assembly as described above.

Figure 6:
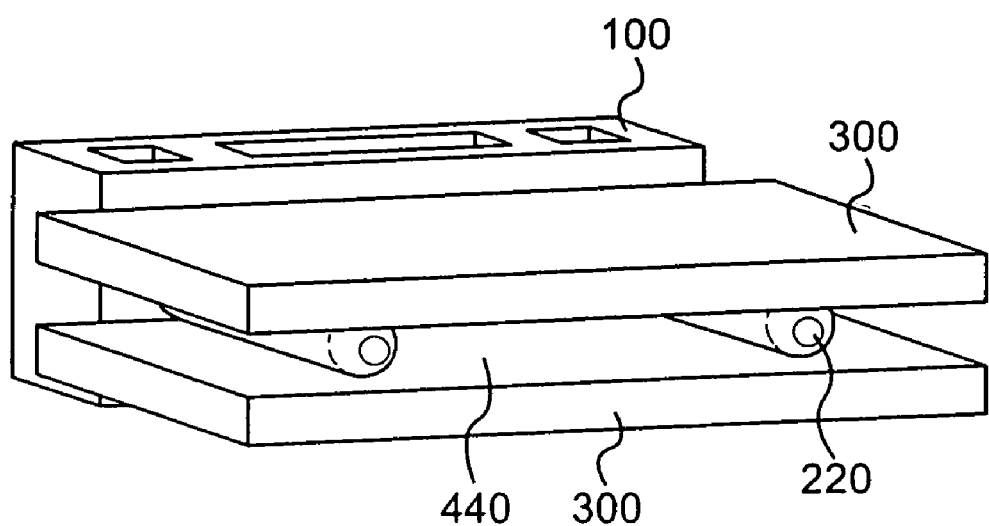
FIG. 6 depicts a view of an assembly incorporating two substrates according to an embodiment of the present invention.

Numerous variations are possible within the scope of the invention. For example, FIG. 6 depicts an alternative embodiment of the invention pursuant to which two substrates 300 are mounted via the pins 220 to the connector body 100. Referring to FIG. 6, each of the substrates 300 may be may have optical components coupled on either the upper or lower surface. In addition, distinct layers of the arrays of bores may be located between the substrates or outside of the substrates. Monitoring devices may also be attached or machined onto the substrates depending on the configuration. One or both of the substrates may be actively aligned relative to the connector 100 or the pins 220 and adhered to the pins 220 to create optical connections between one or more of the substrates 300 and the connector 100 The cover 500 may be used according to this embodiment to encapsulate the assembly as described above.

While specific embodiments of the invention have been shown and described, it will be understood by those having ordinary skill in the art that changes may be made to those embodiments without departing from the spirit and scope of the invention.

What is claimed is:

1. A connector body for coupling between optical assemblies, comprising:
    a body having opposing first and second surfaces;
    the body including two pin bores extending from the first surface to the second surface,
    the body further including an array of bores for carrying optical fibers between the first and second surfaces and a pair of cavities, each cavity extending from a third surface of the body to a corresponding one of the pin bores and the cavities, each of the pair of cavities being isolated from the array of bores;
    wherein the pin bores are adapted to receiving centering pins that protrude from the first and second surfaces, the centering pins facilitating attachment and alignment with mating assemblies.

2. The body according to claim 1:
    wherein the array of bores is situated between the pin bores.

3. The body according to claim 2, further comprising a central cavity extending from a third surface of the body to the array of bores.

4. The body according to claim 2, wherein each of the cavities is substantially rectangular in cross-section.

5. The body according to claim 2, further comprising a central cavity extending from the third surface of the body to the array of bores.

6. The body according to claim 5, further comprising:
a beveled surface extending from the second surface toward the first surface and meeting the third surface, the beveled surface intersecting the second surface adjacent to the array of bores.

7. An optical assembly for mating optical fibers and terminating optical components, comprising:
a connector body according to claim 1;
optical fibers positioned within at least some of the bores in the array of bores in the connector body;
a substrate including at least two grooves formed in a substrate surface and extending from an edge of the substrate;
centering pins positioned in the pin bores and the grooves, the centering pins connecting the connector body to the substrate; and
an active optical component mounted on the substrate engaged in optical communication with at least some of the optical fibers.

8. The assembly according to claim 7, further comprising a cover positioned around the substrate.

9. A substrate for mating optical components with a connector body according to claim 1, comprising:
a substrate for mounting active optical components, the substrate including at least two grooves formed in a surface of the substrate and extending from an edge of the substrate for receiving centering pins, wherein the centering pins are used to align and connect the connector body to the substrate.

10. The substrate according to claim 9, further comprising:
A horizontal emitting active optical component mounted to the substrate for transmitting at least one beam toward the edge of the substrate.

11. The substrate according to claim 9, further comprising:
a lens component mounted to the substrate between the edge emitting active optical component and the edge of the substrate for focusing at least one of the at least one beam.

12. The substrate according to claim 9, further comprising:
a vertical emitting active optical component mounted to the substrate adjacent to the edge for transmitting at least one beam.

13. The substrate according to claim 9, further comprising:
a monitoring diode mounted to the substrate adjacent to the edge for monitoring the transmitting of the at least one beam.

14. The substrate according to claim 13, further comprising:
a lens component mounted to the substrate between the active optical component and the edge of the substrate for focusing at least one of the at least one beam.

15. The substrate according to claim 9, further comprising:
an active optical component mounted to the substrate for receiving at least one beam from the edge of the substrate.

* * * * *

UNITED STATES PATENT AND TRADEMARK OFFICE
CERTIFICATE OF CORRECTION

| | | |
|---|---|---|
| PATENT NO. | : 7,213,976 B2 | Page 1 of 1 |
| APPLICATION NO. | : 10/644762 | |
| DATED | : May 8, 2007 | |
| INVENTOR(S) | : Franklin F. K. Tong and Allan Hui | |

It is certified that error appears in the above-identified patent and that said Letters Patent is hereby corrected as shown below:

On the Title Page, under item (65) Prior Publication Data, please add the following:

-- Related U.S. Application Data

(60) Provisional application No. 60/404,930, filed on August 22, 2002. --

Signed and Sealed this

Twenty-third Day of February, 2010

David J. Kappos
*Director of the United States Patent and Trademark Office*